Feb. 8, 1966  R. C. SCHUBERT  3,233,411
HYDRAULIC MECHANISM

Filed July 2, 1963  2 Sheets-Sheet 1

RICHARD C. SCHUBERT
INVENTOR

John R. Faulkner
BY Jerry G. Beck
ATTORNEYS

Feb. 8, 1966 R. C. SCHUBERT 3,233,411
HYDRAULIC MECHANISM
Filed July 2, 1963 2 Sheets-Sheet 2
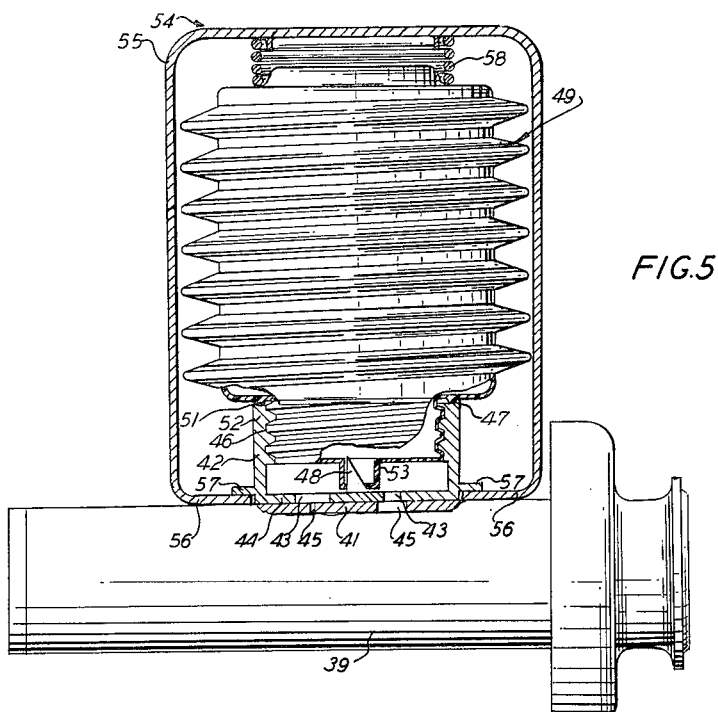
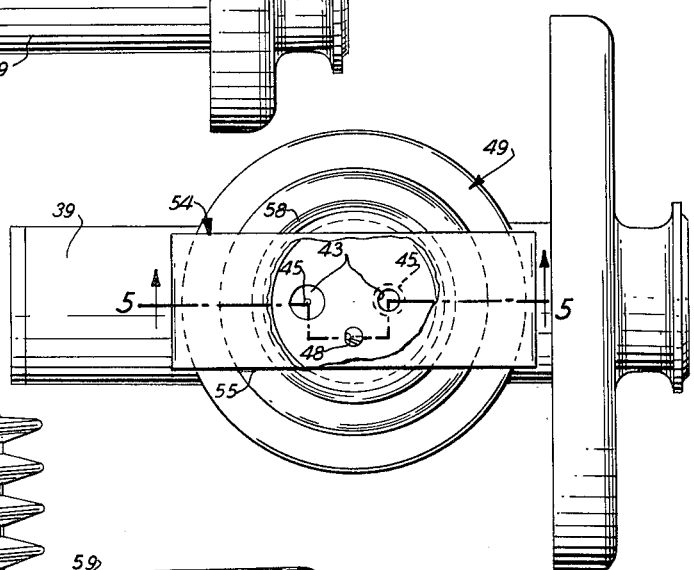
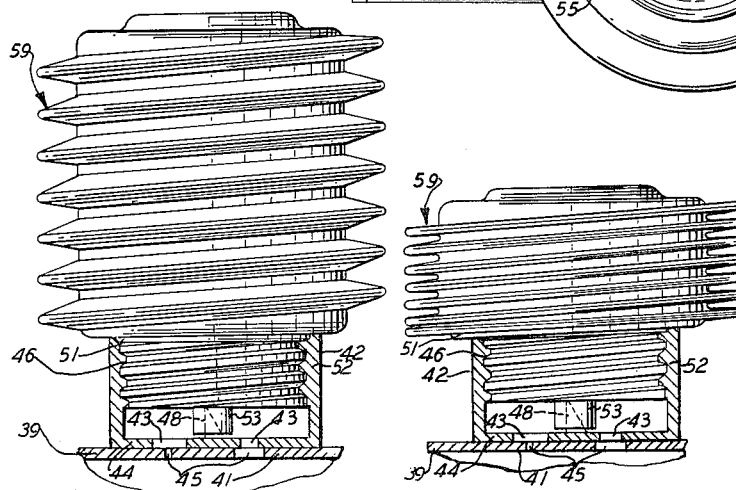
RICHARD C. SCHUBERT
INVENTOR
BY John R. Faulkner
Jerry G. Beck
ATTORNEYS

United States Patent Office 3,233,411
Patented Feb. 8, 1966

3,233,411
HYDRAULIC MECHANISM
Richard C. Schubert, Inkster, Mich., assignor to Ford Motor Company, Dearborn, Mich., a corporation of Delaware
Filed July 2, 1963, Ser. No. 292,412
1 Claim. (Cl. 60—54.6)

This invention relates to a hydraulic mechanism and more particularly to a hydraulic actuator having a separate reservoir that can be detachably mounted thereon.

In conventional fluid brake systems for motor vehicles, a master cylinder comprises an actuator portion having an integral fluid reservoir that is provided with a threaded cap. To inspect the fluid level in the reservoir, it is necessary to remove the cap and during this inspection, dirt may enter to contaminate the fluid.

In addition, most reservoirs are provided with an air vent to maintain the brake fluid under atmospheric pressure. Brake fluid is hygroscopic in nature, and therefore, the provision for a vent may result in the absorption of moisture by the fluid. As the vaporization temperature of the brake fluid decreases when its moisture content increases, failure of the hydraulic brake system may be effected, especially during hot weather. Corrosion of the components of the system in contact with the water contaminated brake fluid may also result.

Accordingly, it is the purpose of this invention to provide a hydraulic mechanism having a separate actuator part and a separate reservoir part. The reservoir comprises a self-contained unit having a pliable, collapsible portion and a rigid mounting portion provided with a closure means to retain hydraulic fluid. The actuator has a receiving means that is adapted to detachably engage the mounting portion for attachment of the reservoir to the actuator. A communicating means, that is disposed in the receiving means, opens the closure means of the reservoir to provide for the flow of hydraulic fluid into the actuator when the rigid mounting portion is engaged by the receiving means. The pliable portion of the reservoir collapses to place the hydraulic fluid flowing from the reservoir into the actuator under pressure.

Hydraulic fluid is sealed into the reservoir at the factory to assure that only high-quality brake fluid is utilized. As the communicating means opens the sealed unit only after the reservoir is mounted on the actuator, the hydraulic fluid is not exposed to dirt or moisture. The collapsible construction of the reservoir results in maintaining the hydraulic fluid under pressure to prevent the creation of a vacuum in the brake system. If the fluid has fallen below a specified minimum level, the depleted reservoir may be detached and a new factory sealed unit readily installed.

In the presently preferred embodiment of this invention, the reservoir is manufactured from a transparent or semitransparent material and filled with a brake fluid colored by dye to facilitate visual inspection without opening the unit.

Therefore, it is one of the principal objects of this invention to provide a replaceable reservoir filled with hydraulic fluid and sealed at the factory that can be readily mounted on an actuator of a hydraulic mechanism.

It is a further object to provide a hydraulic mechanism in which the hydraulic fluid is never exposed to atmosphere, thereby preventing its contamination by dirt and water.

It is another object to provide a sealed reservoir in which the hydraulic fluid contained therein is placed in communication with the interior of the actuator only after the reservoir is mounted thereon.

It is still a further object of this invention to provide a transparent or semitransparent reservoir containing hydraulic fluid, so that the fluid level can be readily ascertained.

These objects and other advantages of the present invention will become apparent from the following description, reference being had to the accompanying drawings, wherein:

FIGURE 4 is a top plan view of a master cylinder including a reservoir of a second embodiment of this invention with the reservoir shown partially cut away;

FIGURE 5 is a side elevational view, partially in section, of the master cylinder shown in FIGURE 4;

FIGURE 6 is a side elevational view of a filled reservoir of a third embodiment of this invention;

FIGURE 7 is a side elevational view of the reservoir of FIGURE 6 but depicted in a collapsed or emptied condition; and, FIGURE 8 is a sectional view of a filled reservoir of a fourth embodiment of this invention shown detached from the actuator portion of the master cylinder.

Figure 1:
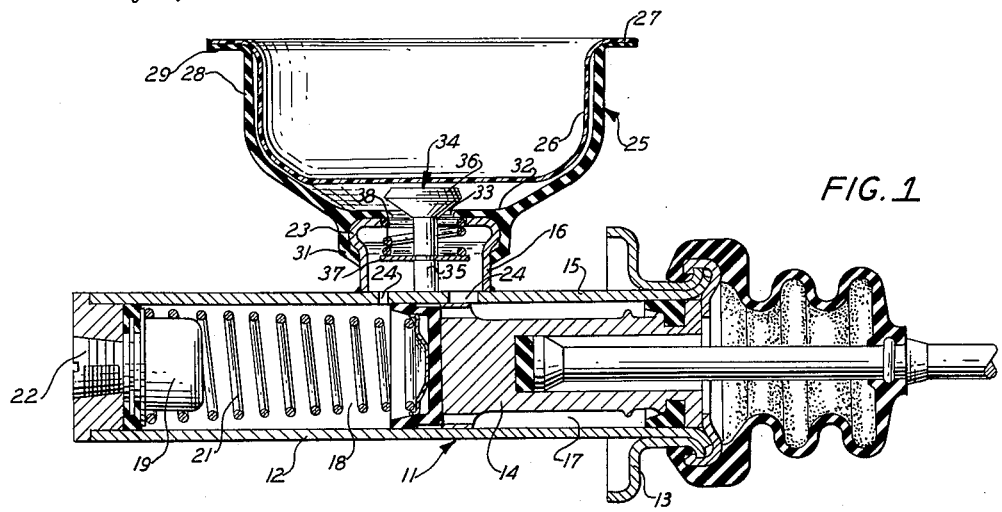
FIGURE 1 is a sectional view of a master cylinder of a vehicle hydraulic brake system with a reservoir of a first embodiment of this invention mounted on an actuator portion of the master cylinder and with the reservoir shown in a collapsed or emptied condition.

Referring now to the drawings and particularly to FIGURE 1, there is seen a master cylinder, generally designated 11, for a vehicle brake system. The master cylinder 11 comprises a horizontally disposed actuator 12 provided with a flange 13 at one end thereof. A reciprocating piston 14 is mounted in the actuator 12 and is connected to a foot pedal (not shown) for actuation by the driver of the vehicle.

The actuator 12 has a wall 15 to which an upwardly extending boss 16 is attached. Inside the actuator 12, a cylindrical chamber 17 is located behind the piston 14 and a pressuring chamber 18 is located forward of the piston 14. A check valve assembly 19 is mounted in the front end of the actuator 12 and is held in a seated position by a spring 21. A port 22 permits the connection of the chamber 18 with the wheel cylinders (not shown) of a vehicle brake system. The boss 16 has a ridge portion 23 at its upper periphery to receive a reservoir as hereinafter described. The wall 15 is provided with a pair of ports 24 to establish communication between the cavity defined by the boss 16 and the chambers 17 and 18 inside the actuator 12.

Figure 3:
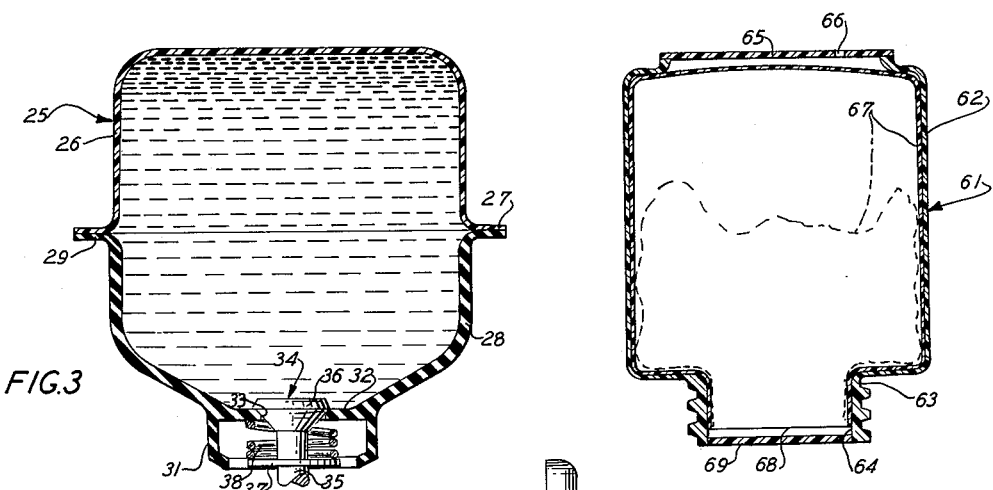
FIGURE 3 is a sectional view of the reservoir portion of the master cylinder of FIGURE 1 but with the reservoir shown detached from the actuator portion and in a filled condition.
Figure 2:
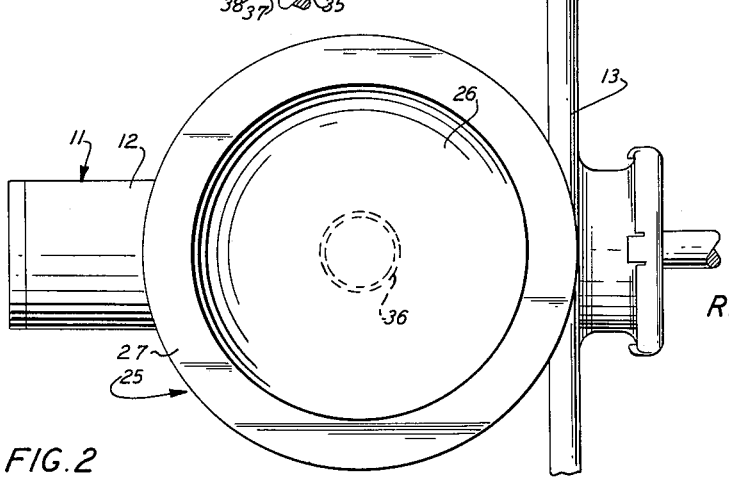
FIGURE 2 is a top plan view of the master cylinder of FIGURE 1.

In FIGURES 1 through 3, a reservoir 25 constructed according to the first embodiment of this invention is disclosed. The reservoir 25 comprises a collapsible, inverted upper cup-shaped section 26 provided with a flange 27 and a lower cup-shaped section 28 also provided with a flange 29. The flanges 27 and 29 are sealed together to form a self-contained sealed unit.

The upper section 26 is molded from a relatively transparent or semitransparent, pliable plastic material while the lower section 28 is molded from a rigid material. The lower cup-shaped section 28 is provided with a resilient gripping portion 31 at its lower end. This gripping portion 31 is separated from the main body of the lower section 28 by an internal partition 32 having a chamfered outlet 33.

A spring pressed valve 34 is attached to the lower end of the reservoir 25. The valve 34 comprises a valve stem 35 having a valve head 36 at one end and a washer 37 intermediate its ends. A spring 38 disposed between the washer 37 and the partition 32 (FIGURE 3) holds the valve head 36 in a position sealing the outlet 33.

To secure the reservoir 25 to the actuator 12, the resilient gripping portion 31 is forced over the ridge portion 23 of the boss 16. As the valve stem 35 extends beyond the gripping portion 31, its lower end contacts the upper surface of the wall 15 causing the valve head 36 to unseat. This allows fluid contained in the reservoir 25 to flow into the cavity of the boss 16 and from the cavity through the ports 24 into the chambers 17 and 18. When the fluid is withdrawn from the reservoir 25 to replenish fluid lost in the brake system, the upper cup-shaped section 26 collapses inwardly to maintain the fluid under atmospheric pressure as best seen in FIGURE 1.

When the reservoir 25 is empty, it can be readily removed from the boss 16 by pulling the gripping portion 31 over the ridge portion 23. The filled reservoir 25 as seen in FIGURE 3, with its outlet 33 maintained in a closed position by the spring loaded valve 34, is ready for mounting on the actuator 12 to provide additional hydraulic fluid for the brake system.

The empty reservoir 25 may be disposed or sent back to the factory for refilling. To refill the reservoir 25, a pressurized fluid supply is connected to the outlet 33. The fluid entering the reservoir 25 will push the collapsed upper cup-shaped section 26 outwardly until the unit is again completely filled as seen in FIGURE 3.

A second embodiment of the present invention is illustrated in FIGURES 4 and 5. A master cylinder actuator 39 similar in construction to the actuator 12 of FIGURES 1 through 3 is provided. The actuator 39 has a wall 41 to which a cylindrical boss 42 is secured. The boss 42 has two ports 43 in its base 44 to place the interior cavity of the boss 42 in communication with ports 45 in the wall 41. The boss 42 is provided with an internal threaded portion 46 and a counterbore 47 at its upper end. A piercing means, such as a knife blade 48, extends upwardly from the base 44 of the boss 42.

A reservoir 49 containing hydraulic fluid is provided to serve as a fluid supply for the actuator 39. The upper portion of the reservoir 49 is molded from a transparent, pliable material with a bellows-type construction and collapses when fluid is withdrawn therefrom. The lower portion of the reservoir is formed from a relatively rigid plastic material. It is provided with a lip 51 and an external threaded cylindrical portion 52. A sealed cylindrical tip 53 offset from the center axis of the reservoir 49 projects from the cylindrical portion 52.

To install the reservoir 49 on the actuator 39, the cylindrical portion 52 is threaded onto the portion 46 until the lip 51 of the reservoir 49 sealingly engages the counterbore 47. At the same time the knife blade 48 pierces the sealed tip 53 to allow the hydraulic fluid contained in the reservoir 49 to flow through the ports 43 into the actuator 39.

To maintain the fluid in the reservoir 49 under a positive pressure, a spring means 54 is provided to collapse the upper portion of the reservoir 49 as fluid is withdrawn therefrom. The spring means 54, in this instance, comprises a rectangular-shaped retainer 55 open on two sides and having two inwardly extending flanges 56 at its base. The pair of flanges 56 is received between projections 57 extending outwardly from the boss 42 and the upper surface of the wall 41 to permit the attachment of the retainer 55 to the actuator 39. A coil spring 58 is disposed between the top surface of the retainer 55 and the upper exterior surface of the reservoir 49 to exert pressure thereon in order to collapse the bellows-type upper portion of the reservoir 49 as the fluid is withdrawn through the pierced tip 53.

An alternate construction of the reservoir 49 is shown in FIGURES 6 and 7. In this instance, the upper portion of a reservoir 59 is also of a bellows-type construction but is self-collapsing, thus eliminating the need for an external spring means to exert pressure on it. The upper portion of the reservoir 59 is molded in its collapsed position as seen in FIGURE 7 but readily expands upon being filled with hydraulic fluid under pressure as seen in FIGURE 6.

To fill the reservoir 59, a hydraulic fluid pressurized supply is attached to the tip 53 and fluid is pumped into the reservoir 59 until it expands to its full size. Then the tip 53 is sealed to maintain the fluid in the reservoir 59. To attach the reservoir 59 to actuator 39, for instance, the portion 46 is threaded into the boss 42 in the same manner as reservoir 49. The reservoir 59 collapses upon the withdrawal of fluid through the pierced tip 53 as seen in FIGURE 7.

Figure 8:
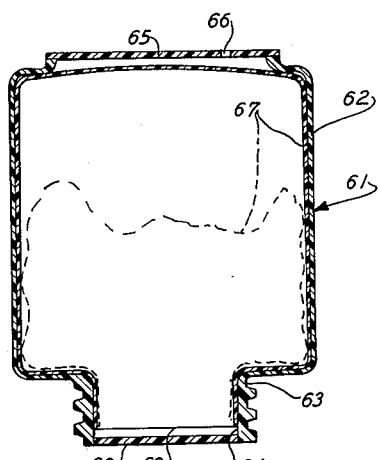

FIGURE 8 shows another embodiment of the invention. A reservoir 61 is disclosed in a detached condition and ready for mounting on an actuator such as actuator 39 of FIGURE 5.

The reservoir 61 comprises a cylindrical container 62 preferably molded from a rigid transparent material. The reservoir 61 has an external threaded cylindrical portion 63 at its lower end that encompasses an opening 64. The upper end of the container 62 is sealed by a cover 65 that is provided with a small air vent 66. An expansible flexible bag 67 is placed inside the rigid cylindrical container 62. The bag 67 may be manufactured from transparent polyethylene film to provide the desired properties.

The bag 67 has an outlet 68 that is secured to the internal peripheral surface of the opening 64 of container 62. When the bag 67 is filled with hydraulic fluid through its outlet 68, it expands to fill the entire cylindrical container 62. A closure cap 69 is then placed in the opening 64 to seal the container 62, thereby retaining the fluid in the bag 67.

When the reservoir 61 is mounted on the actuator 39, the closure cap 69 is pierced in a manner as previously described in connection with the second and third embodiments of this invention. As hydraulic fluid is withdrawn from the bag 67, air enters the cylindrical container 62 through the air vent 66. This air acts on the outside surface of the flexible bag 67 to cause it to collapse to maintain the fluid flowing from the reservoir 61 into the actuator part 39 under atmospheric pressure. The bag 67 is depicted in a partially collapsed condition by the dotted lines in FIGURE 8.

It will be readily understood that the various reservoirs embodying this invention provide a replaceable fluid supply unit for a hydraulic brake system that can be filled with fluid and sealed at the place of manufacture. This assures the driver of the vehicle that the fluid to be utilized in the brake system of his vehicle meets acceptable engineering standards and, thus, will reduce the probability of failure of the brake system caused by low-grade or defective brake fluids.

Further, spare reservoirs can be readily carried in the vehicle to assure a constant supply in case of need. The reservoirs are molded from a transparent or semitransparent plastic material that will disclose the relative level of the fluid within the reservoir. A dye can be added to the fluid to further facilitate inspection.

As the reservoirs are sealed at the time of filling and never exposed to air, moisture or dirt, contamination is eliminated. Hygroscopic absorption of moisture is prevented as the reservoirs of this invention are not vented to atmosphere. The collapsible sealed reservoirs are designed to avoid the creation of a vacuum in the hydraulic system that might cause malfunctioning.

Although this invention has been described in connection with master cylinders for brakes, it is applicable to other types of hydraulic actuators as well.

It will be understood that various structural features of the illustrated embodiments of this invention can be readily interchanged between the several embodiments presented. Further, it will be understood that various modifications may be made without departing from the spirit and scope of the invention as defined in the appended claim.

I claim:

A hydraulic mechanism having a separate actuator part and a separate reservoir part, said actuator part having an interior pressure chamber, said reservoir part comprising a rigid container having a mounting portion and an air vent in one of its walls, said mounting portion having an opening, a pliable collapsible bag containing hydraulic fluid disposed in said container and having outlet means sealingly secured to the periphery of said opening, closure means for said opening to retain the hydraulic fluid in said bag, said actuator part having receiving means adapted to detachably engage said mounting portion and to receive said closure means, and communicating means disposed within said receiving means and adapted to open said closure means to provide for the flow of hydraulic fluid from said bag into said chamber upon the engagement of the rigid mounting portion by said receiving means, said pliable collapsible bag collapsing under atmospheric pressure induced by air entering said container through said air vent to place the hydraulic fluid flowing from said bag into said chamber under pressure.

References Cited by the Examiner

UNITED STATES PATENTS

| | | | |
|---|---|---|---|
| 2,815,152 | 12/1957 | Mills | 222—386.5 |
| 2,831,610 | 4/1958 | Dennie. | |
| 3,059,671 | 10/1962 | Kings | 60—54.6 X |

FOREIGN PATENTS

| | | |
|---|---|---|
| 584,121 | 9/1959 | Canada. |
| 885,352 | 5/1943 | France. |
| 1,134,211 | 8/1962 | Germany. |

SAMUEL LEVINE, *Primary Examiner.*

EDGAR W. GEOGHEGAN, JULIUS E. WEST,
*Examiners.*